May 8, 1956   E. C. RANEY   2,744,337
CONTROL APPARATUS
Filed March 27, 1953
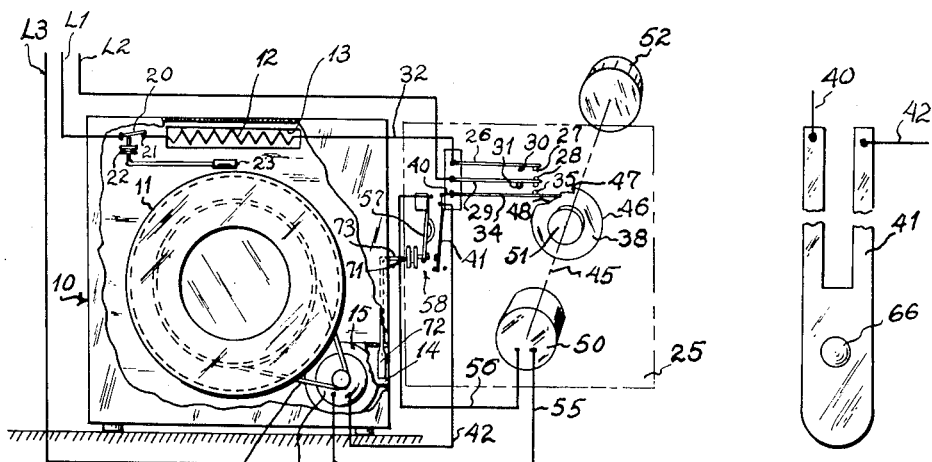
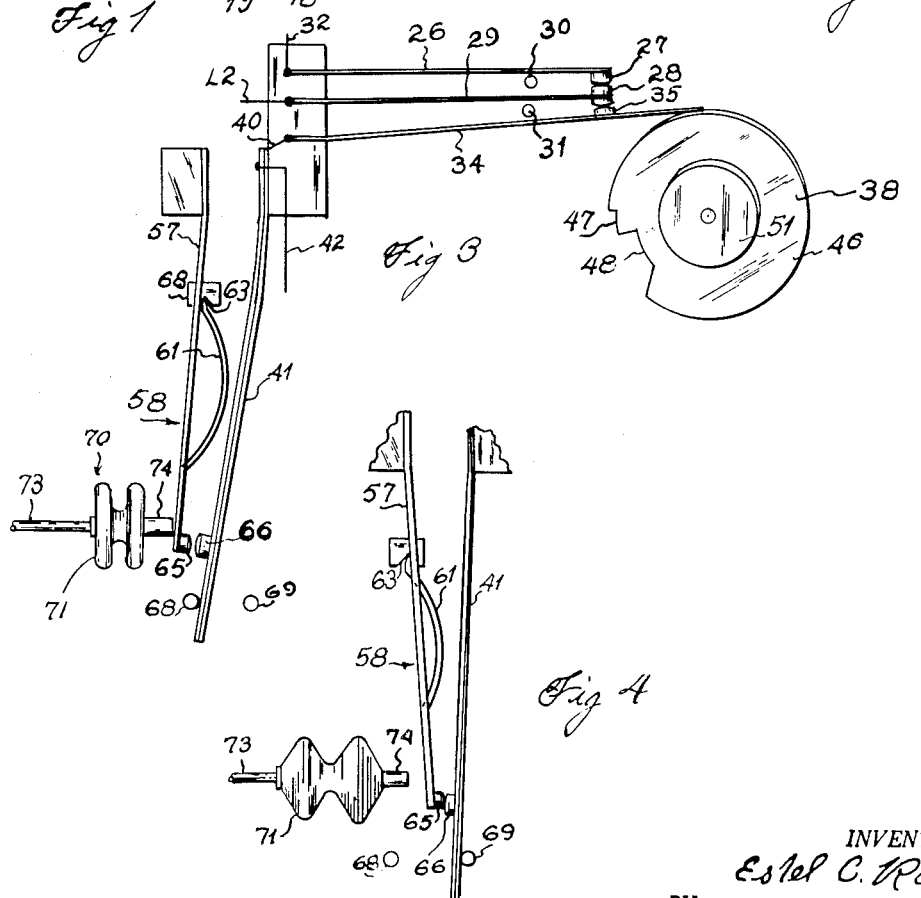
INVENTOR.
Estel C. Raney
BY Roy E. Raney
his Attorney

United States Patent Office 2,744,337
Patented May 8, 1956

2,744,337

CONTROL APPARATUS

Estel C. Raney, Fort Lauderdale, Fla., assignor to Ranco Incorporated, Columbus, Ohio, a corporation of Ohio Application March 27, 1953, Serial No. 344,968

5 Claims. (Cl. 34—45)

The present invention relates to an improved control apparatus for clothes driers, particularly of the so-called domestic type, having an air heating unit, a revolving clothes containing drum or basket and a fan for moving air into contact with the heating unit and through the basket.

One object of the invention is to provide an improved control apparatus for clothes driers such as that referred to comprising, manually operated means by which the heating unit and drive motor for the fan and basket are energized or activated, a timer device adapted to be set by the operator, preferably simultaneously with the initiation of operation of the heating unit and motor, and operative to render the heating unit and motor inoperative after predetermined periods, respectively, following initiation of operation of the timer device, the operation of which timer device is initiated by an element responsive to a predetermined condition of air passing from the basket, and means to prevent interruption of the operation of the timer device by the air condition responsive element so that the heating unit and the motor will operate for the predetermined periods desired irrespective of changes in the condition of the air moving from the basket during such periods.

Another object of the invention is to provide an improved control apparatus for clothes driers of the type referred to in which the timer is rendered inoperative by means responsive to a predetermined operation of the timer.

A more specific object of the invention is the provision of an improved control apparatus of the character referred to comprising two switches for controlling, respectively, the heating unit and the motor for driving the fan and basket and which switches are adapted to be closed manually and opened by operation of a timer motor, the timer motor being controlled by a third switch including an operating member movable between two switch operating positions to cause opening and closing of the third switch, respectively, the operating member being moved from its switch opening to its switch closing position by an element, such as a thermal element responsive to a predetermined temperature of the air passing from the clothes basket, to initiate operation of the timer, and which element is incapable of moving the operating member to its switch opening position, and means operative upon deenergization of the fan and basket driving motor to return the operating member of the third switch from its switch closing to its switch opening position.

Other objects and advantages of the invention will be apparent from the following description of a preferred embodiment of the invention, reference being had to the accompanying drawings in which Fig. 1 is a diagrammatic showing of a domestic type clothes drier and a control apparatus therefor embodying the invention;

Fig. 2 is an elevational view of a bimetal element in the control apparatus;

Fig. 3 is fragmentary view of the control apparatus shown in Fig. 1, but on a larger scale and illustrating certain parts in different positions; and, Fig. 4 is a view similar to Fig. 3 but showing certain parts in still other positions.

The clothes drier in which the improved control is utilized may be of any suitable conventional construction and the one illustrated comprises a cabinet 10 having a rotating clothes drum or basket 11 in which the clothes to be dried are tumbled while heated air is passed through the basket, which may be perforated or otherwise open to permit air to pass through the tumbling clothes, as is well understood in the art. In the present instance the air is heated by an electrical heating unit 12 located within cabinet 10 and arranged to heat air drawn into the cabinet through an opening 13. The heating unit is of the 220 v. type and is supplied by current through lines L1, L2 of a three phase circuit. The air is drawn through the opening 13, and moves over the heating unit 12, through the basket 11 and out of the cabinet through an exhaust outlet 14 by a fan or blower 15. The basket 11 and fan 15 are driven by an electric motor 18, the basket being driven through a belt 19 and the fan being connected directly to the motor. It is to be understood that any suitable driving arrangement could be employed.

Preferably, the energization of the heating unit 12 is controlled to limit the temperature of the air passing through the basket by a suitable thermostatically operated switch which is connected in series circuit with the heater and which includes a movable contact 20 which closes on a fixed contact 21 and is moved by a thermally responsive device comprising an expansible element 22 having a tube and bulb 23 connected therewith and filled with a heat responsive fluid. The bulb 23 is positioned within the cabinet 10 so that it is subjected to the temperature of air passing from the heating unit 12 to the basket 11, and when the temperature of the air reaches a predetermined maximum the expansible element expands and actuates the switch contact 20 to deenergize the heater, and when the air temperature falls to a predetermined degree the element contracts and closes contacts 20, 21 to reenergize the heater, as is well understood in the art.

In addition to the switch 20, 21 the circuit of the heating unit 12 is controlled by a manually closable switch comprising a suitable frame or housing indicated at 25, a spring blade 26 anchored at one end to the frame and carrying a contact 27 at the free end thereof, which contact is arranged to engage a double-faced contact 28 carried on the free end of a blade 29 similar to blade 26. The blades 26, 29 have a downward bias which normally urges them against stops 30, 31 respectively, which stops are positioned on the frame 25 to cause separation of the two contacts when engaged by the springs. Blade 26 is connected with one side of the heating unit 12 by a wire 32 and blade 29 is connected to L2.

The motor 18 is controlled by a switch mechanism including a spring blade 34 anchored at one end to the frame 25 and carrying a contact 35 near its free end which is adapted to engage the underside of the double contact 28 when the blade is flexed upwardly as shown in Fig. 3. The blade 34 is normally biased downwardly and the free end rides on the periphery of a cam 38 which is formed to cause the blade to be moved into and out of engagement with the under surface of contact 28 when the cam is rotated, as is described more fully hereinafter. It will be seen that one side of the circuit for motor 18 includes line L2, blade 29, contacts 28, 35, blade 34, wire 40, a bimetal element 41, and wire 42 to one terminal of the motor. The other terminal of the motor is connected to line L3. The bimetal 41 is described more fully hereinafter.

The cam 38 is suitably mounted in the frame 25 to rotate on an axis indicated at 45 and its periphery has a high segment 46, an intermediate segment 47 and a low segment 48, and the segments are interconnected in the order named by abrupt drops or steps, as shown in the drawings. The free end of blade 34 rides on the segments 46, 47, 48 according to the angular position of the cam, and as the cam rotates clockwise from the positions shown in Fig. 1, the blade 34 rides up onto the segment 46 causing contact 35 to engage contact 28 and raise blade 29 from its stop 31 and move contact 28 into engagement with contact 27, thereby closing the circuits for the heating unit 12 and motor 18. Continued rotation of the cam causes the blade 34 to drop from segment 46 to segment 47. Stop 30 is so positioned that when blade 34 drops to segment 47, blade 26 engages the stop and thereby effects separation of contacts 27, 28 thereby opening the circuit of the heating unit. Further rotation of the cam 38 causes the switch blade 34 to drop from segment 47 to segment 48, and stop 31 is positioned so that switch blade 29 engages it and causes separation of the contacts 28, 35 to break the circuit of the motor 18. The steps between the segments of the cam causes a snap movement and separation of the contacts thereby minimizing arcing at the contacts.

The cam 38 is adapted to be rotated clockwise relatively slowly by an electrically driven timer motor 50, which is preferably the well known synchronous type, and is adapted to drive the cam through a suitable gear reduction, not shown. Preferably, a suitable one-way slip clutch 51 is interposed between the gear train and the cam 38 so that the cam may be rotated clockwise manually and independently of the motor 50 and the gear train. The manual rotation of cam 38 is effected by a knob 52 which is suitably connected thereto and arranged to be readily accessible to the operator of the drier. It will be seen that by rotating the knob 52 clockwise the switching mechanism comprising contacts 27, 28, 35 can be closed to initiate a clothes drying operation and the cam 38 can at the same time be set in a position in which the blade 34 is on the segment 46 whereby the heating unit 12 and the motor 18 will be deenergized sequentially in predetermined intervals following initiation of operation of the timer motor 50. The knob 52 also affords means by which the cam may be rotated to cause blade 34 to drop to the low segment 48 of the cam and thereby open both the heating unit and motor circuits to terminate operation of the drier, as desired.

One terminal of the timer motor 50 is connected with line L3, through a wire 55, and the other terminal is connected by a wire 56 to a flexible blade 57 of an overcenter snap switch 58 which controls energization of the timer motor. Any suitable overcenter switch could be employed, and in the form shown, it comprises the switch blade 57 which is anchored to the frame 25 at its upper end, as viewed in the drawings, and has a central longitudinally extending opening therethrough in which a bowed tongue portion 61, formed integral therewith, is located, the upper end of which tongue is pivoted in a V-notch 63 located on the frame so that the blade 57 can be flexed from one side to the other of a plane extending through the pivot for the tongue and the point of connection of the tongue with the blade and which is referred to as the centerline of the blade. By this arrangement, the bowed tongue 61 is operative to urge the free end of the blade to whichever side of the center line of the blade the lower end of the blade may be moved, as described hereinafter.

The blade 57 has a contact 65 attached to one side adjacent to the free end thereof, which contact is arranged to engage a contact 66 attached to the bimetal 41, when the blade 57 is moved to the right of its centerline. It will be seen that the timer motor 50 is energized by a circuit traced from L3, wire 55, motor 50, wire 56, blade 57, contacts 65, 66, bimetal 41, wire 40, blade 34, contacts 35, 28, blade 29 to L2. When the blade 57 is moved to the left of its center line, the circuit for the timer motor is broken by separation of the contacts 65, 66.

The bimetal 41 is U-shaped and the upper ends of the legs thereof are anchored to the frame 25 and the free portion is adapted to flex so that the lower end thereof moves between two stops 68, 69, when the bimetal is cooled and heated, respectively. The stops 68, 69 are located on the frame 25, and when the bimetal 41 is cool it engages stop 68 and in flexing to this stop is capable of moving the switch blade 57 against the tension of the tongue 61 and to the left of its center line as shown in Fig. 3. The U shape and electrical resistance of the bimetal is such that it causes the bimetal to be heated by the passage of current through the legs thereof upon the energization of motor 18, which heating causes the lower end thereof to deflect to the right from the stop 68 to the stop 69, as shown in Fig. 2. The bimetal is preferably of relatively light mass so that it heats and cools quickly.

It will be seen that when the motor 18 is energized, the bimetal 41 will be heated and move to stop 69 and the switch blade 57 will be capable of being moved over center and held to the bimetal to complete the circuit for the timer motor 50, and when the circuit for motor 18 is deenergized, the switch blade 57 will be moved over center to the left by the bimetal as the latter cools, to break the timer motor circuit.

The switch blade 57 is adapted to be moved over center to the right by a thermally responsive device 70 in response to the attainment of a predetermined high temperature of the air exhausted through the exhaust outlet 14, which temperature results when the clothes in the basket 11 are approaching a dry condition. The device 70 may be of any suitable construction several of which are well known in the art, and for illustration is shown comprising a bellows 71 having a bulb 72 attached thereto by a tube 73, and the bellows, bulb and tube are filled with a suitable liquid which expands upon an increase in temperature in the range encountered in the exhaust air. The bellows has an abutment 74 formed of a suitable dielectric material which engages the blade 57 when the latter is in the left hand position, as seen in Fig. 2. The bulb 72 is located to be subjected to the exhaust air and when the temperature thereof is below 155° F., for example, the abutment 74 on the bellows 71 is in a position which permits the blade 57 to be held by the tongue 61 to the left of its center line with contact 65 out of range of engagement by contact 66. Upon a rise in air temperature above 155° F. the bellows 71 is expanded to cause the switch blade 57 to be moved to the right over its dead center so that the spring 61 snaps the blade to the bimetal 41, as seen in Fig. 4, and causes engagement of contacts 65, 66 to energize the timer motor 50.

It will be understood that the form of thermally responsive device shown is more or less schematic and it may include one or more movement amplifying levers, adjustment screw mechanism, etc. which are well known in the thermostatic art.

It will be seen that to initiate a drying cycle, the knob 52 is rotated to cause cam 38 to raise blade 34 and close contacts 27, 28, 35. The length of time the drier operates following the rise in temperature at the bulb 72 to 155° F. will depend upon the angular position in which the cam 38 is set. For "damp" drying, i. e. partial drying of the clothes, the cam is set to cause the switch blade 34 to trip open contacts 27, 28, after a relatively short period of operation of the timer motor 50, and for increasing the dryness of the clothes the cam is set to require a greater degree of rotation before the switch blade drops onto segment 47 to open the circuit of the heating unit. The knob 52 preferably has a pointer, now shown, which cooperates with indicia on a dial plate, not shown, to indicate the degree of dryness which will be produced for any given setting of the knob.

It will be apparent that after the circuit of the heating unit is opened, the circuit for motor 18 continues to be held through contacts 28, 35 until blade 34 drops onto the segment 48, which may be a period of five minutes, for example, which will cause the clothes to be cooled for comfortable handling.

Attention is directed to the fact the bellows 71 is ineffective to open the contacts 65, 66, whereby the timer motor 50 is maintained energized although the temperature of the air exhausted through the opening 14 may be materially reduced during the interval following opening of contacts 27, 28 of the heating unit 12 and the opening of contacts 28, 35 to deenergize the motor 18. Thus, the bellows 71 and its bulb 72 may be arranged to be quite sensitive to temperature changes in the exhaust air so that successive drying cycles can be effected in the manner described.

It is understood that while but one form of the invention has been shown, other forms or modifications and adaptations could be made, all of which fall within the scope of the claims which follow.

I claim:

1. In a clothes drier having a revolving clothes basket, a heating unit, a fan for moving air into heat exchange relation with said heating unit and through said basket, and an electric motor for driving said fan and basket, the combination of means to control said motor comprising, a timer device adapted to be set to operate for a predetermined period and then cause said motor to be inoperative, said timer device including electrically controlled driving means, switch means to control energization of said driving means and including a switch member movable to first and second switching positions to energize and deenergize said driving means, respectively, a thermally responsive element for moving said member from said second to said first position in response to a predetermined condition of the air passing from said basket, said element being ineffective to move said member from said first to said second position, and means operative substantially simultaneously with deenergization of said motor to move said switch member from said first to said second position.

2. In a clothes drier having a revolving clothes basket, a heating unit, a fan for moving air into heat exchange relation with the heating unit and through the basket, and a motor for driving the fan and basket, the combination of means to control the motor comprising, a timer device adapted to be set to operate for a predetermined period and then cause the motor to be inoperative, said timer including an electric drive means, an over center switching mechanism including an actuating member movable between first and second positions to energize and deenergize said drive means respectively, a thermally responsive element having a unidirectional connection with said actuating member and operative to move said member from said second to said first position to energize said driving means in response to a rise to a predetermined temperature of air passing from said basket and being ineffective to move said member from said first to said second position, and means responsive to deenergization of said motor to move said member from said first to said second position.

3. In a clothes drier having a revolving clothes basket, a heating unit, a fan for moving air into heat exchange relation with said heating unit and through said basket, and a motor for driving said fan and basket, the combination of means to control said heating unit and motor comprising, two electric switches, an electric motor driven timer adapted to be manually set to close said switches and after a predetermined period of operation of the timer motor to first open one of said switches controlling said heating unit and after a second predetermined period to open the other of said switches to deenergize the first mentioned motor, a third switch to energize said timer motor and including an operating member movable between first and second positions to respectively open and close said third switch, a thermally responsive element adapted to move said operating member from said first to said second position only, and means responsive to operation of said timer for said second predetermined period to move said operating member from said second position to said first position.

4. In a clothes drier having a revolving clothes basket, a heating unit, a fan for moving air into heat exchange relation with said heating unit and through said basket, and a motor for driving said fan and basket, the combination of means to control said motor comprising, a timer device adapted to be set to operate for a predetermined period and then cause said motor to be inoperative, means to initiate operation of said timer motor comprising an over center operating member adapted to be snapped over center from a first to a second control position in which position the operation of the timer is initiated and prevented from operation respectively, an element responsive to a condition of the air passing from the basket and engageable with said member to move it from said second control position and cause said member to snap move therefrom to said first control position, and electrically responsive power means energized concurrently with operation of said motor and operative when deenergized to move said control member from said first toward said second control position and when energized to move to a position relative to said member to permit the latter to be moved to said first control position by said thermally responsive element.

5. In a clothes drier having a revolving clothes basket, a heating unit, a fan for moving air into heat exchange relation with said heating unit and through said basket, and a motor for driving said fan and basket, the combination of means to control said heating unit and motor comprising, two electric switches, an electric motor driven timer adapted to be manually set to close said switches and after a predetermined period of operation of said timer motor to open a first of said switches controlling said heating unit and after a second predetermined period to open the second of said switches to deenergize the first mentioned motor, a third switch to energize said timer motor and including an operating member movable by an over center action between first and second positions to open and close said third switch respectively, a thermally responsive element adapted to engage and move said operating member from said first position toward said second position whereby said member is snapped therefrom and moved to said second position and out of engagement with said element, an electrically energized power member responsive to the flow of current through the second mentioned switch and operative upon deenergization thereof to cause said operating member to move from said second to said first position and upon energization thereof to move to a position relative to said member to permit the latter to be moved into said first position by said thermally responsive element.

References Cited in the file of this patent

UNITED STATES PATENTS

| | | |
|---|---|---|
| 2,398,880 | Broglie | Apr. 23, 1946 |
| 2,463,934 | Allen | Mar. 8, 1949 |
| 2,505,041 | Gorsuch | Apr. 25, 1950 |
| 2,645,032 | Hammell | July 14, 1953 |
| 2,654,961 | Manecke | Oct. 13 1953 |